May 2, 1950 W. L. ROESSNER Re. 23,225

GARMENT CONSTRUCTION

Original Filed Aug. 18, 1948

INVENTOR.
William L. Roessner:
BY
Bertha L. McGregor
ATTORNEY

Reissued May 2, 1950

Re. 23,225

UNITED STATES PATENT OFFICE 23,225

GARMENT CONSTRUCTION

William L. Roessner, Denver, Colo.

Original No. 2,492,444, dated December 27, 1949, Serial No. 44,941, August 18, 1948. Application for reissue February 13, 1950, Serial No. 143,985

1 Claim. (Cl. 2—228)

Matter enclosed in heavy brackets [ ] appears in the original patent but forms no part of this reissue specification; matter printed in italics indicates the additions made by reissue

This invention relates to garment constructions designed to be worn by players of ball games, such as baseball, soft ball, and the like. It is adapted to aid the umpire in making correct decisions as to whether the play constitutes a "ball" or a "strike."

Official baseball rules provide that a fairly delivered ball is a ball pitched or thrown to the bat by the pitcher while standing in his position and facing the batsman that passes over any portion of the home base, before touching the ground, not lower than the batsman's knees nor higher than his shoulder. For every such fairly delivered ball the umpire shall call one strike.

Conventional baseball pants are made of material which is of uniform color or appearance throughout, and usually the color is light. Such pants comprise a body portion which extends downwardly from the waistline of the wearer and merges into leg portions which extend well below the knees so as to provide ample material to permit the lower extremities of the leg portions to be doubled by turning them inwardly and upwardly. The free lower edges are hemmed and stitched to provide a circumferential pocket adapted to receive an elastic ring, to provide for contraction and expansion of the lower extremities of the leg portions. These lower contracted portions of the pants are designed to engage the stockings and legs of the wearer slightly below the knee, and the leg portions are intended to be long enough to provide a doubled portion surrounding each leg in the region just below the knee.

Some players adjust the lower extremities of the pants legs in such manner that the visible portion of the pants legs extends only a few inches below the center of the knee cap. Others arrange the elastic end portions well down on the calf of the leg, leaving little extra material to be doubled and exposing almost the full length of the pants legs below the wearer's knees.

It is difficult for the umpire to decide whether a played ball has passed below or above the batsman's knees. When the player's uniform is worn so that the pants legs extend a substantial distance below his knees the umpire cannot judge accurately the location of the knees and may call a "strike" when in fact the ball may have passed lower than the batsman's knees.

The misjudgment of balls is made more probable, also, by the fact that balls and most uniforms are light in color and fail to present any contrasting appearance in the play.

The object of my invention is to provide a garment construction for ball game players which will indicate the location of the wearer's knees and aid the umpire in making correct decisions.

Another object is to provide means in a garment of the character described which will present a contrast to the ball and aid the umpire in determining that a ball which passes the contrasting area is not a fairly delivered ball and therefore does not constitute a strike.

Figure 1:
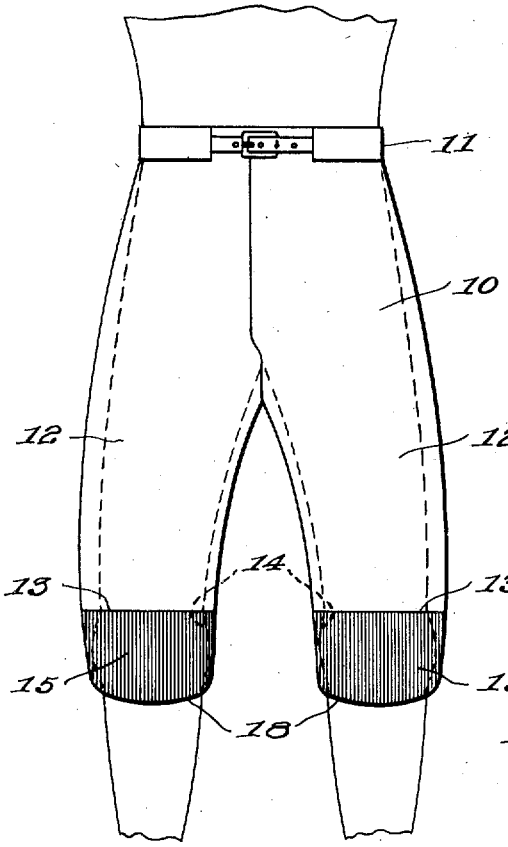
Fig. 1 is a front elevational view of a garment embodying my invention, as it appears when worn by a ball game player, and indicating also part of the body of the wearer.
Figure 2:
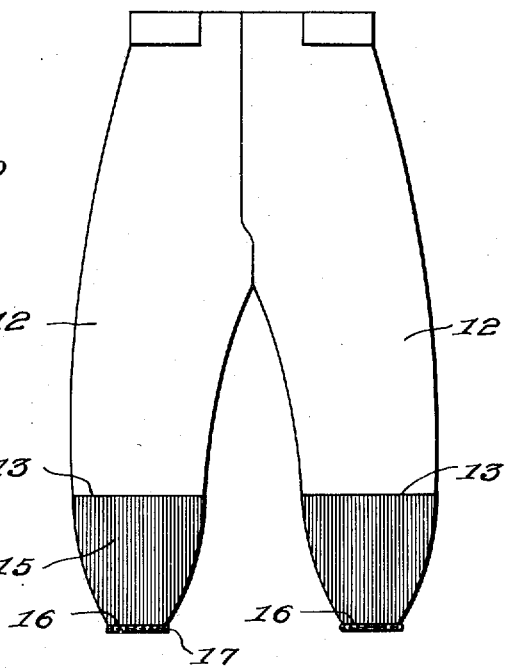
Fig. 2 is a front elevational view of the garment as it appears when not being worn, and the leg portions thereof are fully extended and exposed to view.

In the preferred embodiment of the invention shown in the drawing, the garment takes the form of pants comprising a body portion 10 which extends downwardly from the waistline 11 and merges into leg portions 12 made of uniformly colored plain material or uniformly patterned material, preferably of a light color. Each leg portion 12 terminates in an edge 13 which extends around the wearer's knee in a horizontal plane coinciding with *a portion of* [the center of] the knee cap indicated at 14. Attached to the edge 13 of each leg portion 12, by stitching or other suitable means, is a lower leg member 15 made of material which presents a contrasting appearance to the leg portion 12. Preferably the members 15 are made of dark material, or material of a color or kind which contrasts with the color of the ball used in the game. The free lower edges of the members 15 are overlapped and stitched as indicated at 16 to provide a circumferential pocket 17 enclosing the elastic ring which contrasts the lower extremity of the leg.

The pocketed portion 17 and the material just above it is turned inwardly and upwardly when the garment is being worn, so that the contracted portion engages the leg of the wearer below the knee, and to the observer the folded edge 18 constitutes the lower edge of the pants legs, as shown in Fig. 1.

When properly fitted and worn, the lighter appearing portions of the garment will cover the player's body from or near the waistline downwardly to the horizontal center line of the knees.

The contrasting portions will cover the player's legs from said knee line to a point below the knees. Said contrasting material preferably is dark or of a color of kind which contrasts with the ball being played.

Figure 3:
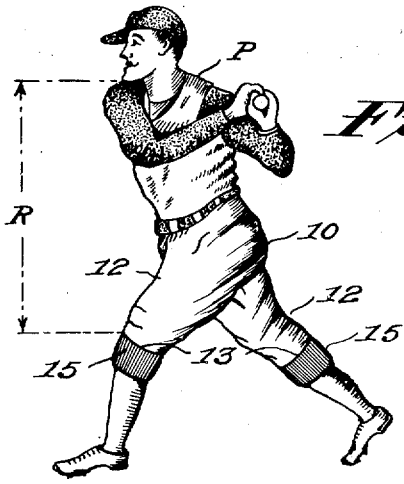
Fig. 3 is a perspective view of a baseball player in batting position and wearing the uniform of Fig. 1, this figure showing the vertical range of ball delivery to constitute a "strike."

The improved garment is shown as being worn by a ball player P in batting position, in Fig. 3. As is shown, the vertical range of ball delivery to the batter at the plate to constitute a strike in accordance with existing rules is limited by [the center of] the player's knee and his shoulder as is indicated at R.

While a batter's knees are usually in adjacency when in batting position and awaiting the delivery of a ball, they may be in variably spaced relation as best suits the player in his particular technique in hitting the ball. In any event, the lower range line 13 will be clearly visible to the umpire and will materially aid him in his decision as to whether the pitched ball is a "strike" or a "ball."

Obviously the invention need not be confined to garments known as pants and may be embodied in garments which extend above the waistline of the player. The essential feature of the invention is the means which serve to indicate to the umpire the actual location of the player's knees while concealed by the garment.

It will be understood, of course, that the official ball game rules may be changed from time to time, and that a "fair" line other than the one now indicated by the batsman's knees may be established. In such event, the line of division between the contrasting portions of the garment, indicated by the seam or edge 13 in this embodiment of the invention, would be raised or lowered to conform to the rules. Such obvious changes come within the scope of my invention.

Changes may be made in details of construction of the garment, and in the character and colors of the materials employed, without departing from the scope of my invention except as set forth in the appended claim.

I claim:

A garment construction to be worn by baseball players and adapted to aid the umpire in making correct decisions as to whether a ball being delivered to a batter constitutes a "ball" or a "strike," comprising a body covering portion having upper leg members which define a crotch therebetween and extend downwardly from the crotch to horizontal lines which coincide approximately with *a portion of* [the center of] the knee caps of the wearer *and constitute the lower limit of the strike zone,* and lower leg portions connected to the upper leg members covering the wearer's legs below said horizontal lines and extending downwardly to below the wearer's knees, said lower leg portions below said horizontal lines presenting a contrasting appearance to the upper leg members above said lines, said lower contrasting leg portions being variable in exposed length by adjustment of the bottom edges of said leg portions on the legs of the wearer, said contrasting leg portions above and below said horizontal lines providing a clear line of demarcation [at the center lines of the wearer's knees] *at said lower limit of the strike zone* irrespective of the adjustment of said bottom edge leg portions.

WILLIAM L. ROESSNER.

REFERENCES CITED

The following references are of record in the file of this patent or the original patent:

UNITED STATES PATENTS

| Number | Name | Date |
|---|---|---|
| D. 67,346 | MacKinnon | May 19, 1925 |
| 2,382,495 | Malatesta | Aug. 14, 1945 |